United States Patent
Yu et al.

(10) Patent No.: US 8,643,609 B2
(45) Date of Patent: Feb. 4, 2014

(54) MULTI-TOUCH SENSING CIRCUIT

(75) Inventors: Jae-suk Yu, Seoul (KR); Yoon-kyung Choi, Yongin-si (KR); Hyoung-tae Kim, Hwaseong-si (KR); Joo-hyeon Lee, Hwaseong-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 681 days.

(21) Appl. No.: 12/618,264

(22) Filed: Nov. 13, 2009

(65) Prior Publication Data

US 2010/0134438 A1    Jun. 3, 2010

(30) Foreign Application Priority Data

Dec. 1, 2008  (KR) .......................... 10-2008-0120686

(51) Int. Cl.
*G06F 3/041* (2006.01)
(52) U.S. Cl.
USPC ........................................ 345/173; 178/18.06
(58) Field of Classification Search
None
See application file for complete search history.

(56) References Cited

U.S. PATENT DOCUMENTS

| | | | | |
|---|---|---|---|---|
| 6,075,520 A | * | 6/2000 | Inoue et al. | 345/173 |
| 2009/0009487 A1 | * | 1/2009 | Nishitani et al. | 345/174 |
| 2009/0102813 A1 | * | 4/2009 | Mamba et al. | 345/174 |
| 2009/0127003 A1 | * | 5/2009 | Geaghan | 178/18.03 |
| 2009/0250268 A1 | * | 10/2009 | Staton et al. | 178/18.06 |
| 2010/0013779 A1 | * | 1/2010 | Wu | 345/173 |
| 2010/0073301 A1 | * | 3/2010 | Yousefpor et al. | 345/173 |
| 2010/0085322 A1 | * | 4/2010 | Mamba et al. | 345/173 |

FOREIGN PATENT DOCUMENTS

| | | |
|---|---|---|
| JP | 2005-135027 | 5/2005 |
| KR | 102007004492 A | 5/2007 |
| KR | 1020070097869 A | 10/2007 |

* cited by examiner

*Primary Examiner* — Adam R Giesy
(74) *Attorney, Agent, or Firm* — F. Chau & Associates, LLC

(57) ABSTRACT

A multi-touch sensing includes a voltage-current converter converting an input voltage into a current. A touch sensing block senses touch of an object. An amplifier includes a first input terminal connected to an output terminal of the voltage-current converter and to a first terminal of the touch sensing block. A second input terminal of the amplifier is grounded. An output terminal of the amplifier is connected to a second terminal of the touch sensing block.

18 Claims, 3 Drawing Sheets

$$V_{OUT} = \frac{I_{in}}{sC_{TS}}$$

$\perp$ : GND

MULTI-TOUCH SENSING CIRCUIT

CROSS-REFERENCE TO RELATED APPLICATION

This application claims priority to and the benefit of Korean Patent Application No. 10-2008-0120686, filed on Dec. 1, 2008, in the Korean Intellectual Property Office, the entire content of which is incorporated by reference herein.

BACKGROUND

The present disclosure relates to sensing circuits, and more particularly, to a multi-touch sensing circuit for minimizing effects of an external capacitive load (C/L).

Touch sensing technology includes a self capacitive method and a mutual capacitive method. Multi-touch is an act of touching at least two objects on a touch portion of a touch sensing device. Pseudo multi-touch is used in the self capacitive method, and multi-touch all point, where any number of independent areas on a touch screen are simultaneously interpreted, is used in the mutual capacitive method.

In the mutual capacitive method, a pulse voltage is applied to a first node of two nodes having constant capacitances, and charge corresponding to the pulse voltage is collected at a second node of the two nodes having constant capacitances. In this case, when a user's finger is put between the two nodes, an electric field between the two nodes is varied, and the amount of charge collected at the second node varies due to the varied electric field. In this case, touch sensing is determined by a difference between the amount of charge collected when touch did not occur and the amount of charge collected when touch occurred.

In the mutual capacitive method, when a large capacitance load exists in a lower portion of a touch sensing circuit, the touch sensing circuit may malfunction. Thus, a shield is typically added to cut off the capacitance load from the touch sensing circuit. However, adding of the shield causes an increase in manufacturing costs of a multi-touch sensing circuit.

SUMMARY

Exemplary embodiments of the present invention provide a multi-touch sensing circuit that has a simple structure and minimizes the effect of a capacitive load.

According to an exemplary embodiment of the present invention, a multi-touch sensing circuit includes a voltage-current converter that converts an input voltage into a current, a touch sensing block that senses touch of an object, and an amplifier. A first input terminal of the amplifier is connected to an output terminal of the voltage-current converter and to a first terminal of the touch sensing block. A second input terminal of the amplifier is grounded. An output terminal of the amplifier is connected to a second terminal of the touch sensing block.

The magnitude and frequency of the input voltage may vary.

The multi-touch sensing circuit may further include a voltage source that generates the input voltage.

The voltage-current converter may be an operational transconductance amplifier.

The touch sensing block may be configured to sense a touch of a capacitive load.

The touch sensing block may include a horizontal line control switch block having a plurality of horizontal line control switches in which a first terminal of each of the horizontal line control switches is commonly connected to the first input terminal of the amplifier and a second terminal of each of the horizontal line control switches is connected to a respective one of a plurality of horizontal lines disposed in a section where touch is sensed, and a vertical line control switch block having a plurality of vertical line control switches in which a first terminal of each of the vertical line control switches is commonly connected to the output terminal of the amplifier and a second terminal of each of the vertical line control switches is connected to a respective one of a plurality of vertical lines disposed in a section where touch is sensed. Insulation material may be interposed between the pluralities of horizontal lines and vertical lines.

The multi-touch sensing circuit may further include a control block that generates control signals used to control switches of the horizontal line control switch block and to control switches of the vertical line control switch block.

The multi-touch sensing circuit may further include a reset switch in which a first terminal of the reset switch is connected to the first terminal of the amplifier and a second terminal of the reset switch is connected to the output terminal of the amplifier.

The pluralities of horizontal lines and vertical lines may be disposed at a side or both sides of a touch screen of a display panel.

The touch sensing block may be configured to sense a touch by a finger of a user.

In accordance with an exemplary embodiment of the present invention a touch sensing apparatus includes a plurality of substantially parallel row circuit lines, a plurality of substantially parallel column circuit lines insulated from the substantially parallel row circuit lines such that a capacitance is formed between a respective one of the substantially parallel row circuit lines and a respective one of the substantially parallel column circuit lines, and a switching circuit coupled to each of the substantially parallel row circuit lines and to each of the substantially parallel column circuit lines and configured to provide an output circuit path to output the capacitance in response to switching circuit control signals.

The capacitance may be variable upon an external capacitive load being applied to an area proximate to the respective one of the substantially parallel row circuit lines and the respective one of the substantially parallel column circuit lines.

The switching circuit may include a respective row switch coupled between a common row output line and a respective row circuit line, a respective column switch coupled between a common column output line and a respective column circuit line, and a switch controller, that provides the switching control signals, coupled to each respective row switch and to each respective column switch. The common row output line and the common column output line may provide the output circuit path when the switching control signals close the respective row switch and the respective column switch.

The switch controller may provide respective switching control signals to close a respective row switch and to close each of the column switches sequentially while the respective row switch remains closed.

The touch sensing apparatus of claim may further include an amplifier, wherein the common row output line is coupled to an input terminal of the amplifier and the common column output line is coupled to an output terminal of the amplifier.

The touch sensing apparatus may further include a voltage-current converter whose output is coupled to the input terminal of the amplifier such that an input current is provided to the amplifier based upon a voltage being input to the voltage-current converter.

BRIEF DESCRIPTION OF THE DRAWINGS

Exemplary embodiments of the present invention will be more clearly understood from the following detailed description taken in conjunction with the accompanying drawings in which.

DETAILED DESCRIPTION OF THE EXEMPLARY EMBODIMENTS

Figure 1:
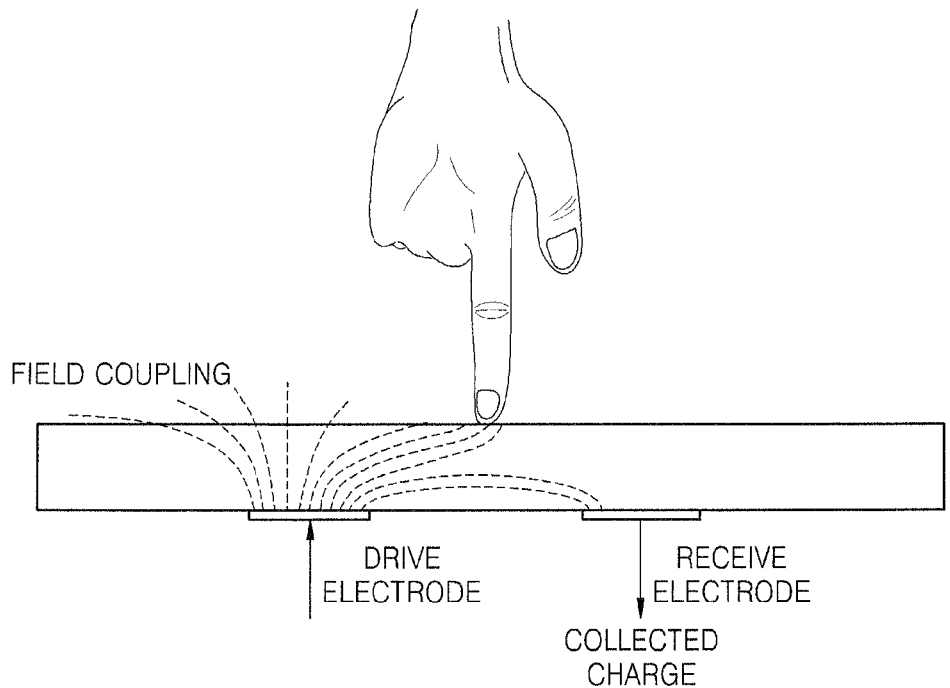
FIG. 1 illustrates a mutual capacitive method.

Hereinafter, exemplary embodiments of the present invention will be described with reference to the attached drawings. Like reference numerals in the drawings denote like elements.

FIG. 1 illustrates a mutual capacitive method. The mutual capacitive method includes applying a predetermined pulse voltage to a drive electrode and collecting charge corresponding to the pulse voltage at a receive electrode. In this regard, when a user's finger is put between the drive electrode and the receive electrode, an electric field (depicted by the dotted lines) varies.

Figure 2:
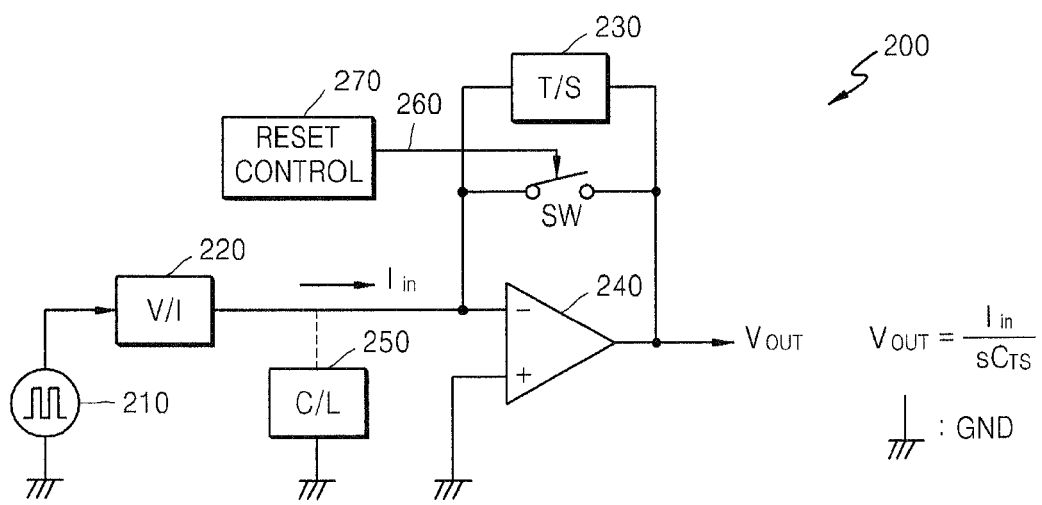
FIG. 2 is a multi-touch sensing circuit according to an exemplary embodiment of the present invention.

FIG. 2 is a multi-touch sensing circuit 200 according to an exemplary embodiment of the present invention. The multi-touch sensing circuit 200 includes a voltage source 210, a voltage-current converter 220, a touch sensing block (T/S) 230, a reset switch SW, and an amplifier 240.

The voltage source 210 generates an input voltage and transmits the input voltage to the voltage-current converter 220, in which the magnitude and frequency of the input voltage may be changed if necessary.

The voltage-current (V/I) converter 220 converts the input voltage into a current $I_{in}$ and supplies the current $I_{in}$ to a first input terminal (−) of the amplifier 240, a first terminal of the reset switch SW, and a first terminal of the touch sensing block 230. Since in accordance with an exemplary embodiment of the present invention the voltage-current converter 220 is introduced so as to convert the input voltage into the current $I_{in}$ and the current $I_{in}$ is used by the touch sensing block 230, conventional problems described below are addressed.

The touch sensing block 230 senses touch by using a capacitive load (capacitor). Detailed descriptions of the use of the capacitor will be provided with reference to FIG. 3.

The reset switch SW resets the multi-touch sensing circuit 200 in response to a reset control signal 260 from a reset control block 270. When the reset switch SW is turned on, the amplifier 240 operates as a buffer for the current $I_{in}$, and a positive terminal of a first capacitor $C_{TS}$ that constitutes the touch sensing block 230 is shorted so that charge accumulated in the first capacitor $C_{TS}$ is discharged to the voltage-current converter 220 and the amplifier 240.

The first input terminal (−) of the amplifier 240 is connected to an output terminal of the voltage-current converter 220 and the first terminal of the touch sensing block 230, and a second input terminal (+) of the amplifier 240 is grounded, and an output terminal of the amplifier 240 is connected to a second terminal of the touch sensing block 230 and a second terminal of the reset switch SW.

Voltage $V_{OUT}$ of the amplifier 240 is obtained by using Equation 1

$$V_{OUT} = \frac{I_{in}}{sC_{TS}} \qquad \text{Equation (1)}$$

wherein $I_{in}$ is the magnitude of the current output from the voltage-current converter 220, $C_{TS}$ is the equivalent capacitance of the touch sensing block 230, and a complex number s corresponds to a frequency of the current $I_{in}$.

A second capacitor 250 can be disposed between voltage-current converter 220 and the input terminal of the amplifier 240. In a conventional sensing circuit (not shown) using voltage as a means for determining touch, charges of the input voltage are distributed to the second capacitor 250 and the first capacitor $C_{TS}$ that constitutes the touch sensing block 230. Thus, the efficiency of the conventional sensing circuit is greatly lowered. Thus, an additional unit for isolating the second capacitor 250 and the capacitor $C_{TS}$ that constitutes the touch sensing block 230 is required. The additional unit causes a system to be complex and increases in the weight of the system and manufacturing costs.

However, in the case of the multi-touch sensing circuit 200 according to the current exemplary embodiment, the second capacitor 250 does not affect the output voltage $V_{OUT}$ of the amplifier 240. This is because, after a predetermined charge is accumulated in the second capacitor 250, the second capacitor 250 does not affect the operation of the multi-touch sensing circuit 200 and the amount of charge accumulated in the first capacitor $C_{TS}$ that constitutes the touch sensing block 230, any more.

When the first capacitor $C_{TS}$ of the touch sensing block 230 is large, the output voltage of the amplifier 240 is reduced, as expressed in Equation 1, and sensing efficiency is lowered. In this case, the frequency s of the current $I_{in}$ is reduced, or the magnitude of the current $I_{in}$ is increased. The voltage-current converter 220 can implemented as an operational trans-conductance amplifier (OTA). In this case, the magnitude of the current output can be adjusted by adjusting transconductance Gm of the OTA.

Figure 3:
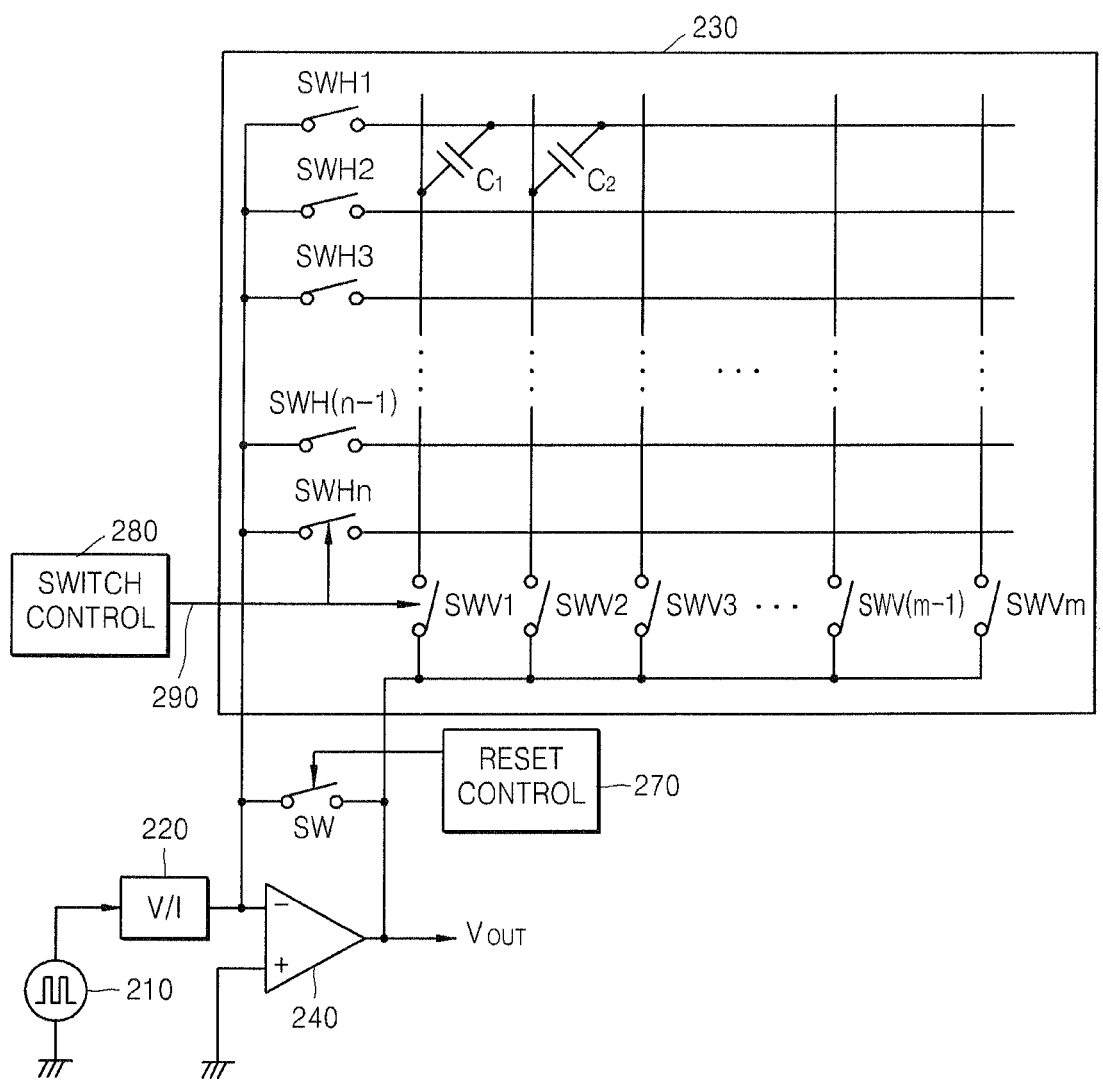
FIG. 3 illustrates a touch sensing block of the multi-touch sensing circuit of FIG. 2.

FIG. 3 illustrates a touch sensing block 230 in the multi-touch sensing circuit of FIG. 2, according to an exemplary embodiment of the present invention. Referring to FIG. 3, the touch sensing block 230 includes a plurality of horizontal line control switches SWH1, . . . , SWH(n-1), SWHn and a plurality of vertical line control switches SWV1, . . . , SWV(m-1), SWVm.

A first terminal of each of the horizontal line control switches SWH1, . . . , SWH(n-1), SWHn is connected to the first input terminal (−) of the amplifier 240 and a second terminal thereof is connected to each of a plurality of horizontal lines disposed in a section where touch is sensed. A first terminal of each of the vertical line control switches SWV1, . . . , SWV(m-1), SWVm is connected to the output terminal of the amplifier 240 and a second terminal thereof is connected to each of a plurality of vertical lines disposed in the section where touch is sensed.

The horizontal and vertical lines illustrated in FIG. 3 can be formed of a metal. A predetermined insulation material is interposed between the horizontal and vertical lines. Thus, between the horizontal and vertical lines is a predetermined capacitance. In addition, the horizontal and vertical lines may be disposed at a side or both sides of a touch screen.

In FIG. 3, between a first horizontal line and a first vertical line when a first horizontal line control switch SWH1 and a first vertical line control switch SWV1 are turned on is a capacitance represented by capacitor C1. Between the first horizontal line and a second vertical line when the first horizontal line control switch SWH1 and a second vertical line control switch SWV 2 are turned on is a capacitance represented by capacitor C2. Capacitors between remaining horizontal and vertical line combinations when corresponding horizontal and vertical line control switches are turned on are omitted for simplicity of the drawing.

As shown in FIG. 3, a switch control block 280 for generating control signals 290 can be used to control each of the switches that constitute the horizontal line control switches SWH1, ..., SWH(n-1), SWHn and the vertical line control switches SWV1, ..., SWV(m-1), SWVm.

The operation of the touch sensing block 230 of FIG. 3 will now be described in more detail.

The output voltage of the amplifier 240 is generated when the first vertical line control switch SWV1 is turned on when the first horizontal line control switch SWH1 is turned on. Next, the first vertical line control switch SWV1 is turned off and then, the second vertical line control switch SWV2 is turned on, and the output voltage of the amplifier 240 is generated again. The above-described processes are performed up to a last vertical line control switch SWVm (where m is an integer).

Subsequently, the first horizontal line control switch SWH 1 is turned off and the second horizontal line control switch SWH2 is turned on, wherein the processes described above are performed using the second horizontal line control switch SWH2. Such an operation is performed using each of the next horizontal line control switch up to a last horizontal line control switch SWHn (where n is an integer).

By performing the above operations, a change in capacitance at a position where predetermined horizontal lines and predetermined vertical lines cross one another can be detected. Thus, a position of the touch sensing block 230 where touch is performed can be recognized. Here, the position is at least one position on the touch sensing block 230.

Although not shown in FIGS. 2 and 3, a processor performing the operations may be further provided.

Figure 4:
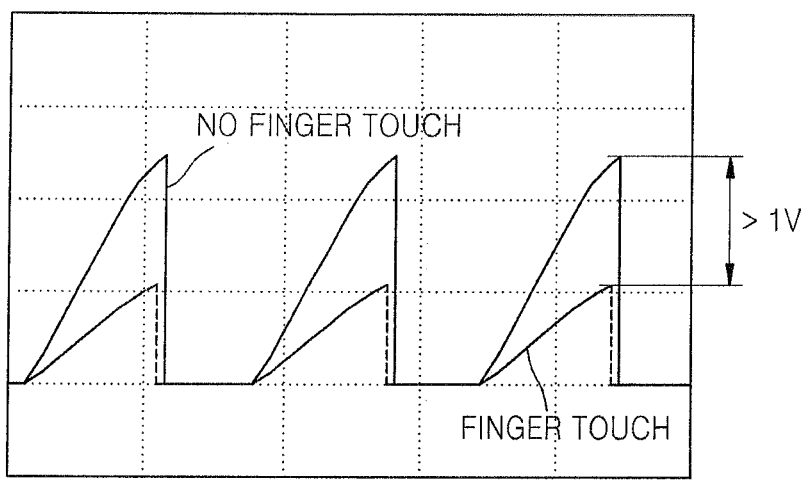
FIG. 4 shows the result of a computer simulation performed using the multi-touch sensing circuit of FIG. 2.

FIG. 4 shows the result of a computer simulation performed using the multi-touch sensing circuit of FIG. 2, according to an exemplary embodiment of the present invention. Referring to FIG. 4, a difference in voltages when a user's finger touches a position of the touch sensing block 230 (Finger touch) from when the user's finger does not touch the position of the touch sensing block 230 (No finger touch) is greater than 1V.

In the above computer simulation, it is assumed that the amplifier 240, the voltage-current converter 220, the plurality of horizontal line control switch blocks SWH1, ..., SWH(n-1), SWHn, and the plurality of vertical line control switch blocks SWV1, ..., SWV(m-1), SWVm are idealistic. The frequency of a voltage source is 600 Hz, and the size of the second capacitor 250 illustrated in FIG. 2 is 100 pico-Farad (pF).

While the exemplary embodiments of the present invention has been particularly shown and described, it will be understood that various changes in form and details may be made therein without departing from the spirit and scope of the following claims.

What is claimed is:

1. A multi-touch sensing circuit comprising:
    a voltage-current converter that converts an input voltage into a current;
    a touch sensing block that is driven by the current and senses touch of an object by using a capacitor internally formed, wherein the capacitance of the capacitor varies according to the touch of an object; and
    an amplifier,
    wherein a first input terminal of the amplifier is connected to an output terminal of the voltage-current converter and to a first terminal of the touch sensing block, a second input terminal of the amplifier is grounded, and an output terminal of the amplifier is connected to a second terminal of the touch sensing block.

2. The multi-touch sensing circuit of claim 1, wherein magnitude and frequency of the input voltage vary.

3. The multi-touch sensing circuit of claim 2, further comprising a voltage source that generates the input voltage.

4. The multi-touch sensing circuit of claim 1, wherein the touch sensing block senses touch of a capacitive load.

5. The multi-touch sensing circuit of claim 1, further comprising a reset switch in which a first terminal of the reset switch is connected to the first terminal of the amplifier and a second terminal of the reset switch is connected to the output terminal of the amplifier.

6. The multi-touch sensing circuit of claim 1, wherein the touch sensing block is configured to sense a touch by a finger of a user.

7. The multi-touch sensing circuit of claim 1, wherein an output voltage of the amplifier varies according to the variation of the capacitance when an object touches the touch sensing block.

8. The multi-touch sensing circuit of claim 1, further comprising a reset switch coupleable in parallel with the touch sensing block.

9. A touch sensing apparatus, comprising:
    a touch panel comprising:
        a plurality of substantially parallel row circuit lines;
        a plurality of substantially parallel column circuit lines insulated from the substantially parallel row circuit lines such that a capacitance is formed between a respective one of the substantially parallel row circuit lines and a respective one of the substantially parallel column circuit lines;
        a switching circuit coupled to each of the substantially parallel row circuit lines and to each of the substantially parallel column circuit lines and configured to provide an output circuit path to output the capacitance in response to switching circuit control signals; and
    an amplifier coupled to the touch panel in parallel,
    wherein a first input terminal of the amplifier is connected to a first terminal of the touch panel, a second input terminal of the amplifier is grounded, and an output terminal of the amplifier is connected to a second terminal of the touch panel, and
    wherein the touch panel is driven by a current received through the first input terminal.

10. The touch sensing apparatus of claim 9, wherein the capacitance is variable upon an external capacitive load being applied to an area proximate to the respective one of the substantially parallel row circuit lines and the respective one of the substantially parallel column circuit lines.

11. The touch sensing apparatus of claim 10, wherein the switching circuit comprises:
    a respective row switch coupled between a common row output line and a respective row circuit line;
    a respective column switch coupled between a common column output line and a respective column circuit line; and a switch controller, that provides the switching control signals, coupled to each respective row switch and to each respective column switch, wherein the common row output line and the common column output line provide the output circuit path when the switching control signals close the respective row switch and the respective column switch.

12. The touch sensing apparatus of claim 11, wherein the switch controller provides respective switching control signals to close a respective row switch and to close each of the column switches sequentially while the respective row switch remains closed.

13. The touch sensing apparatus of claim 11, wherein the common row output line is coupled to an input terminal of the amplifier and the common column output line is coupled to an output terminal of the amplifier.

14. The touch sensing apparatus of claim 13, further comprising a voltage-current converter whose output is coupled to the input terminal of the amplifier such that an input current is provided to the amplifier based upon a voltage being input to the voltage-current converter.

15. A multi-touch sensing circuit comprising:
a voltage-current converter that converts an input voltage into a current;
a touch sensing block that is driven by the current and senses touch of an object by using a variation of capacitance of a capacitor internally formed; and
an amplifier,
wherein a first input terminal of the amplifier is connected to an output terminal of the voltage-current converter and to a first terminal of the touch sensing block, a second input terminal of the amplifier is grounded, and an output terminal of the amplifier is connected to a second terminal of the touch sensing block, wherein the voltage-current converter is an operational trans-conductance amplifier.

16. The multi-touch sensing circuit of claim 15, wherein the touch sensing block comprises:
a horizontal line control switch block comprising a plurality of horizontal line control switches in which a first terminal of each of the horizontal line control switches is commonly connected to the first input terminal of the amplifier and a second terminal of each of the horizontal line control switches is connected to a respective one of a plurality of horizontal lines disposed in a section where touch is sensed; and a vertical line control switch block comprising a plurality of vertical line control switches in which a first terminal of each of the vertical line control switches is commonly connected to the output terminal of the amplifier and a second terminal of each of the vertical line control switches is connected to a respective one of a plurality of vertical lines disposed in a section where touch is sensed, wherein insulation material is interposed between the pluralities of horizontal lines and vertical lines.

17. The multi-touch sensing circuit of claim 16, further comprising a control block that generates control signals used to control control switches of the horizontal line control switch block and to control switches of the vertical line control switch block.

18. The multi-touch sensing circuit of claim 16, wherein the pluralities of horizontal lines and vertical lines are disposed at a side or both sides of a touch screen of a display panel.

* * * * *